(12) United States Patent
Lai et al.

(10) Patent No.: US 11,750,042 B2
(45) Date of Patent: Sep. 5, 2023

(54) WIRELESS CHARGING DEVICE AND WIRELESS CHARGING SWITCHING METHOD

(71) Applicant: MERRY ELECTRONICS (SHENZHEN) CO., LTD., Guangdong (CN)

(72) Inventors: Ke-Yang Lai, Taichung (TW); Chih-Yung Wang, Taichung (TW); Huang-Wei Chen, Taichung (TW); Yung-Hsiang Liu, Taichung (TW)

(73) Assignee: MERRY ELECTRONICS (SHENZHEN) CO., LTD., Guangdong (CN)

( * ) Notice: Subject to any disclaimer, the term of this patent is extended or adjusted under 35 U.S.C. 154(b) by 393 days.

(21) Appl. No.: 17/226,072

(22) Filed: Apr. 8, 2021

(65) Prior Publication Data

US 2022/0255368 A1 Aug. 11, 2022

(30) Foreign Application Priority Data

Feb. 5, 2021 (TW) .................................. 110104573

(51) Int. Cl.
*H02J 7/00* (2006.01)
*H02J 50/80* (2016.01)
*H02J 50/10* (2016.01)

(52) U.S. Cl.
CPC .......... *H02J 50/80* (2016.02); *H02J 7/00712* (2020.01); *H02J 50/10* (2016.02)

(58) Field of Classification Search
USPC ................. 320/106, 107, 108, 109, 110, 112
See application file for complete search history.

(56) References Cited

U.S. PATENT DOCUMENTS

| 9,825,486 | B2 * | 11/2017 | Liu ........................ H02J 50/005 |
| 2012/0235636 | A1 * | 9/2012 | Partovi ................ H04B 5/0093 |
| | | | 320/108 |
| 2019/0341797 | A1 * | 11/2019 | Floresca ................. H02J 50/10 |

* cited by examiner

*Primary Examiner* — Brian Ngo
(74) *Attorney, Agent, or Firm* — CKC & Partners Co., LLC

(57) ABSTRACT

The present disclosure provides a wireless charging switching method, which includes steps as follows. After a proximity sensor disposed in the central area of a coil senses an object, it is determined whether a power bus voltage of a wireless power transceiver electrically connected to the coil has reached a predetermined voltage value during a predetermined period, so as to determine a receiver mode or a transmitter mode for the wireless power transceiver.

19 Claims, 3 Drawing Sheets

WIRELESS CHARGING DEVICE AND WIRELESS CHARGING SWITCHING METHOD

RELATED APPLICATIONS

This application claims priority to Taiwan Application Serial Number 110104573, filed Feb. 5, 2021, which is herein incorporated by reference.

BACKGROUND

Field of Invention

The present invention relates to charging devices and methods, and more particularly, a wireless charging device and a wireless charging switching method thereof.

Description of Related Art

Nowadays, a mobile phone product has a wireless power receiver (Rx) with a wireless power receiver mode and may also have a wireless power transmitter (Tx) with a wireless power transmitter mode that has a reverse charging function of providing power for another electronic device. In general, a manual control interface (e.g., a software control interface) is needed, and the wireless power transmitter mode must be manually turned on through the manual control interface.

In addition, since the normally turned-on state of the wireless power transmitter wastes more power, a manual switch is designed in the power bank product. However, this design requires the user to operate the button, which is inconvenient.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a wireless charging device and a wireless charging switching method, to solve or circumvent aforesaid problems and disadvantages in the related art.

An embodiment of the present disclosure is related to a wireless charging device including a coil, a proximity sensor, a wireless power transceiver, a power management circuit, a battery and a controller. The proximity sensor is positioned in a central area of the coil. The wireless power transceiver is electrically connected to the coil. The power management circuit is electrically connected to the wireless power transceiver. The battery is electrically connected to the power management circuit. The controller is electrically connected to the proximity sensor, the wireless power transceiver, and the power management circuit. After the proximity sensor senses an object, the controller is configured to determine whether a power bus voltage of the wireless power transceiver has reached a predetermined voltage value during a predetermined period, so as to determine a receiver mode or a transmitter mode for the wireless power transceiver.

In one embodiment, when the proximity sensor senses the object, the proximity sensor outputs a sensing signal, the controller determines whether receiving the sensing signal from the proximity sensor, and when the controller receives the sensing signal, the controller switches the wireless power transceiver to the receiver mode and determines whether the power bus voltage has reached the predetermined voltage value during the predetermined period.

In one embodiment, before the proximity sensor outputs the sensing signal, the controller previously turns off both of the receiver mode and the transmitter mode of the wireless power transceiver.

In one embodiment, when the controller determines that the power bus voltage has reached the predetermined voltage value during the predetermined period, the controller allows the object to charge the battery through the coil, the wireless power transceiver and the power management circuit.

In one embodiment, the controller monitors whether a charging current of the power management circuit is less than a predetermined current value, and when the charging current is less than the predetermined current value, the controller turns off both of the receiver mode and the transmitter mode of the wireless power transceiver.

In one embodiment, when the controller determines that the power bus voltage has never reached the predetermined voltage value during the predetermined period, the controller switches the wireless power transceiver to the transmitter mode and charges the object through the coil, the wireless power transceiver and the power management circuit.

In one embodiment, the controller monitors whether an output current of the power management circuit is less than a predetermined current value, and when the output current is less than the predetermined current value, the controller turns off both of the receiver mode and the transmitter mode of the wireless power transceiver.

In one embodiment, the predetermined period is greater than at least five times the length of an object detection interval time of the proximity sensor.

In one embodiment, the wireless charging device further includes a casing. The casing is disposed above the coil, and the casing and the proximity sensor are spaced by a predetermined spacing.

In one embodiment, a detection angle of the proximity sensor through the casing is at least 60 degrees.

In one embodiment, the wireless charging device further includes a rubber layer, a ferrite and a casing. The rubber layer is disposed on the battery, the rubber layer has a containing space, and the proximity sensor is disposed on the battery and disposed in the containing space. The ferrite is disposed on the rubber layer, the ferrite has a first opening, the first opening is disposed above the containing space, the coil is disposed on the ferrite and surrounds the first opening, and the proximity sensor extends from the first opening to the central area of the coil. The casing is disposed above the coil, the casing has a second opening, and the second opening is aligned with the first opening and the proximity sensor.

Another embodiment of the present disclosure is related to a wireless charging switching method, and the wireless charging switching method includes steps of: after a proximity sensor disposed in a central area of a coil senses an object, determining whether the a power bus voltage of a wireless power transceiver electrically connected to the coil has reached a predetermined voltage value during a predetermined period, so as to determine a receiver mode or a transmitter mode for the wireless power transceiver.

In one embodiment, when the proximity sensor senses the object, the proximity sensor outputs a sensing signal, and the wireless charging switching method further includes steps of: determining whether receiving the sensing signal from the proximity sensor; when a controller receives the sensing signal, switching the wireless power transceiver to the receiver mode, and then determining whether the power bus voltage has reached the predetermined voltage value during the predetermined period.

In one embodiment, the wireless charging switching method further includes steps of: before the proximity sensor outputs the sensing signal, turning off both of the receiver mode and the transmitter mode of the wireless power transceiver previously.

In one embodiment, the wireless charging switching method further includes steps of: when determining that the power bus voltage has reached the predetermined voltage value during the predetermined period, allowing the object to charge a battery through the coil, the wireless power transceiver and a power management circuit, wherein the power management circuit is electrically connected to the wireless power transceiver and the battery.

In one embodiment, the wireless charging switching method further includes steps of: monitoring whether a charging current of the power management circuit is less than a predetermined current value; when the charging current is not less than the predetermined current value, continuing to allow the object to charge the battery through the coil, the wireless power transceiver and the power management circuit.

In one embodiment, the wireless charging switching method further includes steps of: when the charging current is less than the predetermined current value, turn off both of the receiver mode and the transmitter mode of the wireless power transceiver.

In one embodiment, the wireless charging switching method further includes steps of: when determining that the power bus voltage has never reached the predetermined voltage value during the predetermined period, switching the wireless power transceiver to the transmitter mode, and charging the object through the coil, the wireless power transceiver and a power management circuit and a battery, wherein the power management circuit is electrically connected to the wireless power transceiver and the battery.

In one embodiment, the wireless charging switching method further includes steps of: monitoring whether an output current of the power management circuit is less than a predetermined current value; when the output current is less than the predetermined current value, turn off both of the receiver mode and the transmitter mode of the wireless power transceiver.

In view of the above, according to the present disclosure, the wireless charging device and the wireless charging switching method of the present disclosure utilize the proximity sensor without the manual switch, so as to automatically perform the activation and switching control of the receiver mode and/or the transmitter mode, thereby saving standby power consumption and achieving better technology effect.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
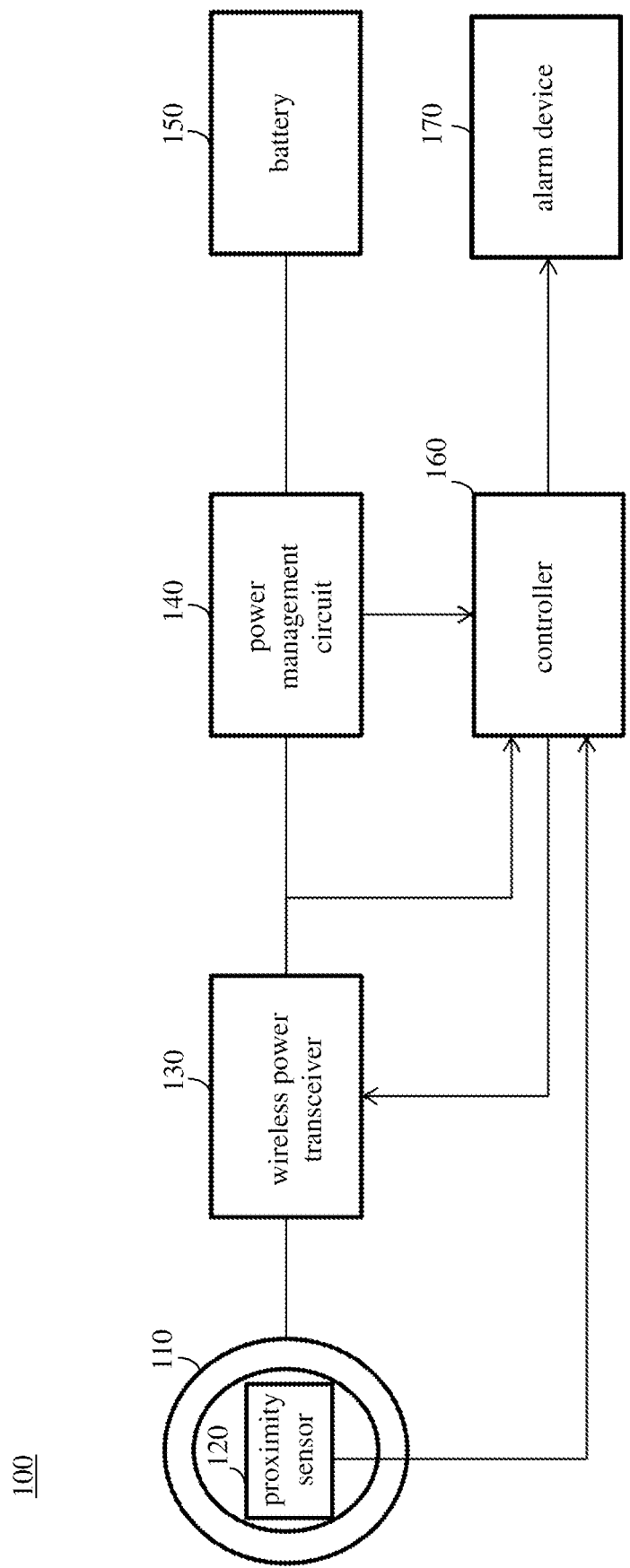
FIG. 1 is a block diagram illustrating a wireless charging device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1. In one aspect, the present disclosure is directed to a wireless charging device 100. This device may be easily integrated into a power bank and may be applicable or readily adaptable to all technologies. It should be noted that the wireless charging device 100 has more advantages. Herewith the wireless charging device 100 is described below with FIG. 1.

The subject disclosure provides the wireless charging device 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a block diagram illustrating the wireless charging device 100 according to some embodiments of the present disclosure. As shown in FIG. 1, the wireless charging device 100 may include a coil 110, a proximity sensor 120, a wireless power transceiver 130, a power management circuit 140, a battery 150, a controller 160, and an alarm device 170. For example, the battery 150 can be a rechargeable battery, the controller 160 can be a micro-controller or other control circuits, and the alarm device 170 can be a warning light, a speaker, a vibration device, or other warning components.

In structure, the proximity sensor 120 is positioned in the central area of the coil 110, the wireless power transceiver 130 is electrically connected to the coil 110, the power management circuit 140 is electrically connected to the wireless power transceiver 130, the battery 150 is electrically connected to the power management circuit 140, and the controller 160 is electrically connected to the proximity sensor 120, the wireless power transceiver 130, the power management circuit 140 and the alarm device 170. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the battery 150 can be directly electrically connected to the power management circuit 140, or the battery 150 can be indirectly coupled with the power management circuit 140 through an electronic circuit.

Figure 2:
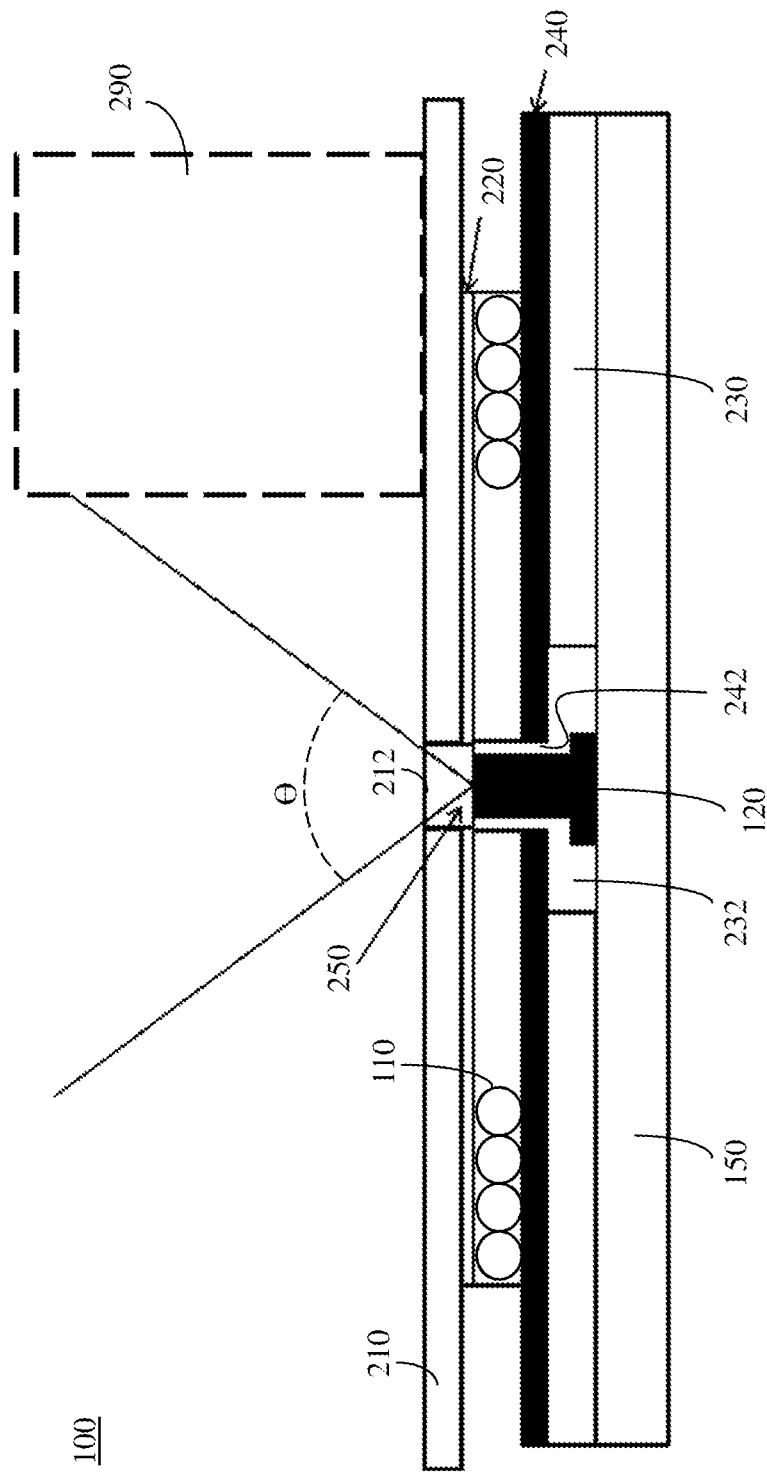
FIG. 2 is a schematic diagram of a partial section of a wireless charging device according to some embodiments of the present disclosure.

In use, after the proximity sensor 120 senses an object 290 (as shown in FIG. 2), the controller 160 is configured to determine whether a power bus voltage of the wireless power transceiver 130 has reached a predetermined voltage value during a predetermined period, so as to determine a receiver mode or a transmitter mode for the wireless power transceiver 130. Therefore, the wireless charging device 100 utilize the proximity sensor 120 without the manual switch, so as to automatically perform the activation and switching control of the receiver mode and/or the transmitter mode.

Specifically, when the proximity sensor 120 senses the object 290, the proximity sensor 120 outputs a sensing signal; on the contrary, when the proximity sensor 120 does not sense the object 290, the proximity sensor 120 does not output the sensing signal. Before the proximity sensor 120 outputs the sensing signal, the controller 160 previously turns off both of the receiver mode and the transmitter mode of the wireless power transceiver 130, so as to save standby power consumption.

The controller can scan the proximity sensor 120 to determine whether receiving the sensing signal (e.g., a logic high level signal) from the proximity sensor 120. When the controller 160 receives the sensing signal, the controller 160 switches the wireless power transceiver 130 to the receiver mode and determines whether the power bus voltage has reached the predetermined voltage value (e.g., about 5V) during the predetermined period (e.g., about 3 second).

In one embodiment of the present disclosure, the predetermined period is greater than about at least five times the length of an object detection interval time of the proximity sensor 120, so as to improve the accuracy of determination of the controller 160.

In practice, when the object 290 has no wireless power supply capability, the power bus voltage is approximately zero voltage; on the contrary, when the object 290 has the wireless power supply capability, the power bus voltage can reach the predetermined voltage value during the predetermined period.

When the controller 160 determines that the power bus voltage has reached the predetermined voltage value during the predetermined period, the wireless power transceiver 130 keep operating in the receiver mode, and the controller 160 allows the object 290 to charge the battery 150 through the coil 110, the wireless power transceiver 130 and the power management circuit 140.

Then, the controller 160 monitors whether a charging current of the power management circuit 140 is less than a predetermined current value (e.g., about 100 mA). In practice, the charging current less than the predetermined current value means that the battery 150 is approximately fully charged. When the charging current is less than the predetermined current value, the controller 160 turns off both of the receiver mode and the transmitter mode of the wireless power transceiver 130.

On the contrary, the charging current greater than the predetermined current value means that the battery 150 has not been fully charged. When the charging current is greater than the predetermined current value, the controller 160 allows the object 290 to continue to charge the battery 150 through the coil 110, the wireless power transceiver 130, and the power management circuit 140.

In addition, when the controller 160 determines that the power bus voltage has never reached the predetermined voltage value during the predetermined period, the controller 160 switches the wireless power transceiver 130 to the transmitter mode and charges the object 290 through the coil 110, the wireless power transceiver 130 and the power management circuit 140.

In practice, for example, when the wireless power transceiver 130 operates in the transmitter mode, in order to confirm whether the object 290 is capable of receiving wireless power, the wireless power transceiver 130 detects whether the object 290 to be wirelessly charged has an error. It should be understood that the specific mechanism of above error detection is well known in the art, and is not be described herein.

When the object 290 to be wirelessly charged has the error, the object 290 is incapable of receiving wireless power, and the controller 160 causes the alarm device 170 to perform an alarm action (e.g., warning lights, warning sounds, vibrations, etc.) to remind the user to remove the object 290 from the wireless charging device 100.

On the contrary, when the object 290 can be wirelessly charged without the error, the controller 160 monitors whether an output current of the power management circuit 140 is less than a predetermined current value (e.g., about 100 mA).

In practice, the output current less than the predetermined current value means that the object 290 is approximately fully charged. When the output current is less than the predetermined current value, the controller 160 turns off both of the receiver mode and the transmitter mode of the wireless power transceiver 130.

On the contrary, the output current greater than the predetermined current value means that the object 290 has not been fully charged. When the output current is greater than the predetermined current value, the controller 160 continues to charge the object 290 through the coil 110, the wireless power transceiver 130, and the power management circuit 140.

For a more complete understanding of the hardware structure of the wireless charging device 100, refer to FIGS. 1 and 2. FIG. 2 is a schematic diagram of a partial section of a wireless charging device 100 according to some embodiments of the present disclosure.

As shown in FIG. 2, the wireless charging device 100 may further include a casing 210. In structure, the casing 210 is disposed above the coil 110, and the casing 210 and the proximity sensor 120 are spaced by a predetermined spacing 220. With the predetermined spacing 220, the proximity sensor 120 has a suitable detection angle $\Theta$. In one embodiment of the present disclosure, the detection angle of the proximity sensor 120 through the casing 210 is at least 60 degrees, thereby effectively detecting the object 290 on the casing 210 and meeting the distance specification for the coil 110 to detect the object 290 as defined in the wireless charging standard.

In one embodiment of the present disclosure, the wireless charging device 100 further includes a rubber layer 230 and a ferrite 240. The rubber layer 230 is disposed on the battery 150, the rubber layer 230 has a containing space 232, and the proximity sensor 120 is disposed on the battery 150 and disposed in the containing space 232. The ferrite 240 is disposed on the rubber layer 230, the ferrite has a first opening 242, the first opening 242 is disposed above the containing space 232, the coil 110 is disposed on the ferrite 240 and surrounds the first opening 242, and the proximity sensor 120 extends from the first opening 242 to the central area of the coil 110. The casing 210 is disposed above the coil 110, the casing 210 has a second opening 212, the second opening 212 is aligned with the first opening 242 and the proximity sensor 120. In this way, the proximity sensor 120 can effectively detect the object 290 on the casing 210.

In practice, for example, the translucent film 250 may be provided in the second opening 212 of the casing 210. The translucent film 250 does not affects the detection of the proximity sensor 120 and can prevents a foreign body from falling into the second opening 212. If the foreign body is into the second opening 212, the operation of the wireless charging device 100 will be affected.

Figure 3:
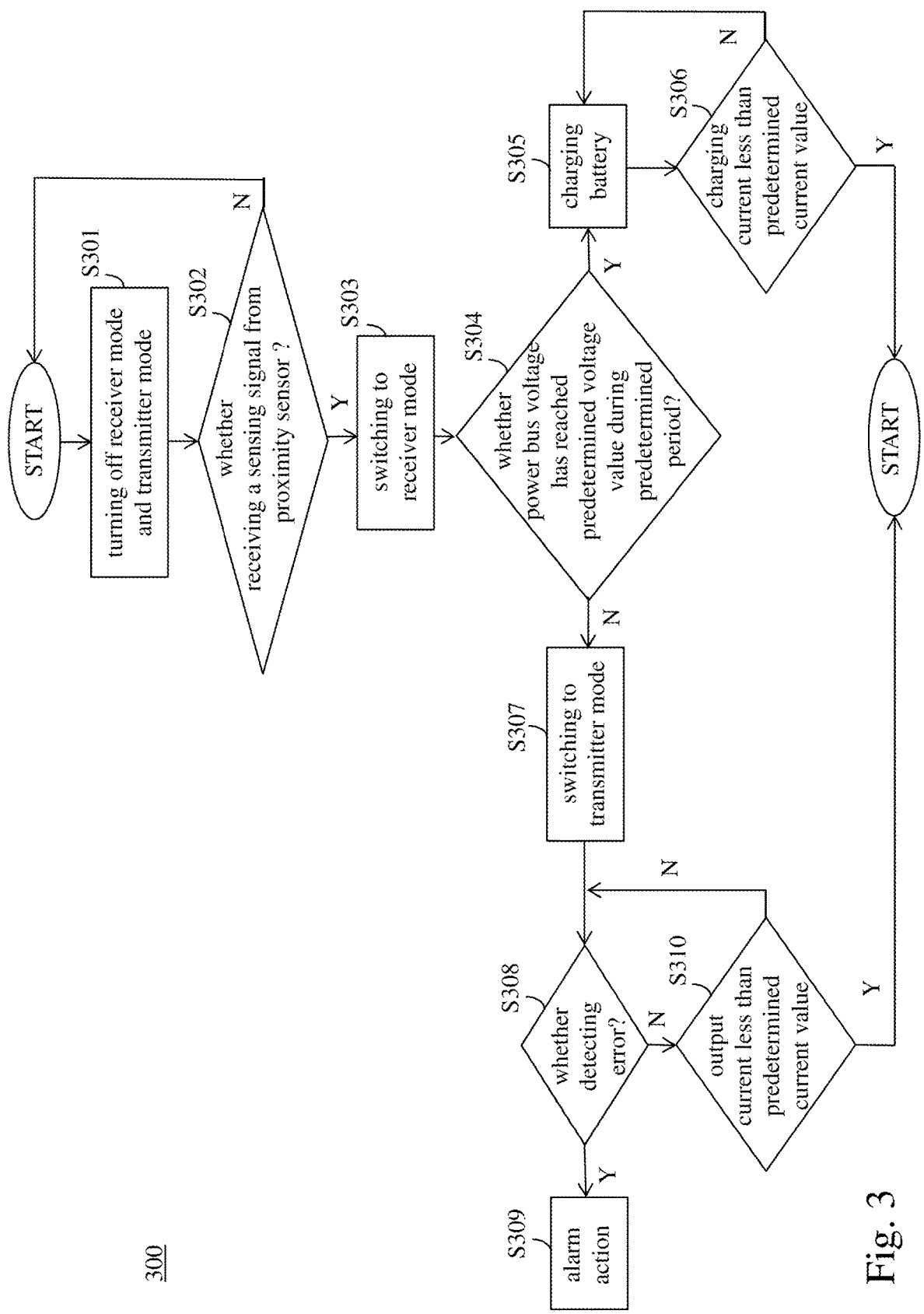
FIG. 3 a flow chart illustrating a wireless charging switching method according to some embodiments of the present disclosure.

For a more complete understanding of a method performed by the wireless charging device 100, referring FIGS. 1-3, FIG. 3 a flow chart illustrating a wireless charging switching method 300 according to some embodiments of the present disclosure. As shown in FIG. 3, the wireless charging switching method 300 includes operations S301 to S310. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In one embodiment of the present disclosure, in the wireless charging switching method 300, after the proximity sensor 120 disposed in the central area of the coil 110 senses the object 290, it is determined whether the a power bus voltage of a wireless power transceiver 130 electrically connected to the coil 110 has reached a predetermined voltage value during a predetermined period, so as to determine a receiver mode or a transmitter mode for the wireless power transceiver 130. Therefore, the wireless charging switching method 300 utilize the proximity sensor 120 without the manual switch, so as to automatically perform the activation and switching control of the receiver mode and/or the transmitter mode.

Specifically, when the proximity sensor 120 senses the object 290, the proximity sensor outputs a sensing signal; on the contrary, when the proximity sensor 120 does not sense the object 290, the proximity sensor does not output the sensing signal. In operation S301, before the proximity sensor 120 outputs the sensing signal, both of the receiver mode and the transmitter mode of the wireless power transceiver 130 are turned off previously, so as to save standby power consumption.

In operation S302, the proximity sensor 120 is scanned to determine whether receiving the sensing signal (e.g., a logic high level signal) from the proximity sensor 120. When the controller 160 receives the sensing signal, in operation S303, the wireless power transceiver 130 is switched to the receiver mode. In operation S304, it is determined whether the power bus voltage has reached the predetermined voltage value during the predetermined period.

When determining that the power bus voltage has reached the predetermined voltage value during the predetermined period, in operation S305, the object 290 is allowed to charge the battery 150 through the coil 110, the wireless power transceiver 130 and the power management circuit 140. The power management circuit 140 is electrically connected to the wireless power transceiver 130 and the battery 150.

In operation S306, it is monitored whether a charging current of the power management circuit 140 is less than a predetermined current value. When the charging current is not less than the predetermined current value, in operation S305, the object 290 is allowed to continue to charge the battery 150 through the coil 110, the wireless power transceiver 130, and the power management circuit 140.

When the charging current is less than the predetermined current value, through the back way to the start of the wireless charging switching method 300, in operation S301, both of the receiver mode and the transmitter mode of the wireless power transceiver 130 are turned off.

In addition, when determining that the power bus voltage has never reached the predetermined voltage value during the predetermined period, in operation S307, the wireless power transceiver 130 is switched to the transmitter mode, and the object 290 is charged through the coil 110, the wireless power transceiver 130, the power management circuit 140 and the battery 150. The power management circuit 140 is electrically connected to the wireless power transceiver 130 and the battery 150.

In practice, for example, when the wireless power transceiver 130 operates in the transmitter mode, in order to confirm whether the object 290 is capable of receiving wireless power, in operation 308, the wireless power transceiver 130 detects whether the object 290 to be wirelessly charged has an error. When the object 290 to be wirelessly charged has the error, in operation 309, the alarm device 170 performs the alarm action.

On the contrary, when the object 290 can be wirelessly charged without the error, in operation 310, it is monitored whether an output current of the power management circuit 140 is less than a predetermined current value. When the output current is less than the predetermined current value, through the back way to the start of the wireless charging switching method 300, in operation S301, both of the receiver mode and the transmitter mode of the wireless power transceiver 130 are turned off.

When the output current is greater than the predetermined current value, the object 290 is continuously charged through the coil 110, the wireless power transceiver 130, and the power management circuit 140, and in operation S308, the wireless power transceiver 130 detects whether the object 290 to be wirelessly charged has the error again.

In view of the above, according to the present disclosure, the wireless charging device 100 and the wireless charging switching method 300 of the present disclosure utilize the proximity sensor without the manual switch, so as to automatically perform the activation and switching control of the receiver mode and/or the transmitter mode, thereby saving standby power consumption and achieving better technology effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless charging device, comprising:
   a coil;
   a proximity sensor positioned in a central area of the coil;
   a wireless power transceiver electrically connected to the coil;
   a power management circuit electrically connected to the wireless power transceiver;
   a battery electrically connected to the power management circuit; and
   a controller electrically connected to the proximity sensor, the wireless power transceiver, and the power management circuit, after the proximity sensor senses an object, the controller configured to determine whether a power bus voltage of the wireless power transceiver has reached a predetermined voltage value during a predetermined period, so as to determine a receiver mode or a transmitter mode for the wireless power transceiver.

2. The wireless charging device of claim 1, wherein when the proximity sensor senses the object, the proximity sensor outputs a sensing signal, the controller determines whether receiving the sensing signal from the proximity sensor, and when the controller receives the sensing signal, the controller switches the wireless power transceiver to the receiver mode and determines whether the power bus voltage has reached the predetermined voltage value during the predetermined period.

3. The wireless charging device of claim 2, wherein before the proximity sensor outputs the sensing signal, the controller previously turns off both of the receiver mode and the transmitter mode of the wireless power transceiver.

4. The wireless charging device of claim 2, wherein when the controller determines that the power bus voltage has reached the predetermined voltage value during the predetermined period, the controller allows the object to charge the battery through the coil, the wireless power transceiver and the power management circuit.

5. The wireless charging device of claim 4, wherein the controller monitors whether a charging current of the power management circuit is less than a predetermined current value, and when the charging current is less than the predetermined current value, the controller turns off both of the receiver mode and the transmitter mode of the wireless power transceiver.

6. The wireless charging device of claim 2, wherein when the controller determines that the power bus voltage has never reached the predetermined voltage value during the predetermined period, the controller switches the wireless power transceiver to the transmitter mode and charges the object through the coil, the wireless power transceiver and the power management circuit.

7. The wireless charging device of claim 6, wherein the controller monitors whether an output current of the power management circuit is less than a predetermined current value, and when the output current is less than the predetermined current value, the controller turns off both of the receiver mode and the transmitter mode of the wireless power transceiver.

8. The wireless charging device of claim 1, wherein the predetermined period is greater than at least five times the length of an object detection interval time of the proximity sensor.

9. The wireless charging device of claim 1, further comprising:
a casing disposed above the coil, and the casing and the proximity sensor are spaced by a predetermined spacing.

10. The wireless charging device of claim 9, wherein a detection angle of the proximity sensor through the casing is at least 60 degrees.

11. The wireless charging device of claim 1, further comprising:
a rubber layer disposed on the battery, the rubber layer having a containing space, and the proximity sensor disposed on the battery and disposed in the containing space;
a ferrite disposed on the rubber layer, the ferrite having a first opening, the first opening disposed above the containing space, the coil disposed on the ferrite and surrounding the first opening, and the proximity sensor extending from the first opening to the central area of the coil; and
a casing disposed above the coil, the casing having a second opening, the second opening is aligned with the first opening and the proximity sensor.

12. A wireless charging switching method, comprising steps of:
after a proximity sensor disposed in a central area of a coil senses an object, determining whether the a power bus voltage of a wireless power transceiver electrically connected to the coil has reached a predetermined voltage value during a predetermined period, so as to determine a receiver mode or a transmitter mode for the wireless power transceiver.

13. The wireless charging switching method of claim 12, wherein when the proximity sensor senses the object, the proximity sensor outputs a sensing signal, and the wireless charging switching method further comprises:
determining whether receiving the sensing signal from the proximity sensor; and
when a controller receives the sensing signal, switching the wireless power transceiver to the receiver mode, and then determining whether the power bus voltage has reached the predetermined voltage value during the predetermined period.

14. The wireless charging switching method of claim 13, further comprising:
before the proximity sensor outputs the sensing signal, turning off both of the receiver mode and the transmitter mode of the wireless power transceiver previously.

15. The wireless charging switching method of claim 13, further comprising:
when determining that the power bus voltage has reached the predetermined voltage value during the predetermined period, allowing the object to charge a battery through the coil, the wireless power transceiver and a power management circuit, wherein the power management circuit is electrically connected to the wireless power transceiver and the battery.

16. The wireless charging switching method of claim 15, further comprising:
monitoring whether a charging current of the power management circuit is less than a predetermined current value; and
when the charging current is not less than the predetermined current value, continuing to allow the object to charge the battery through the coil, the wireless power transceiver and the power management circuit.

17. The wireless charging switching method of claim 16, further comprising:
when the charging current is less than the predetermined current value, turn off both of the receiver mode and the transmitter mode of the wireless power transceiver.

18. The wireless charging switching method of claim 13, further comprising:
when determining that the power bus voltage has never reached the predetermined voltage value during the predetermined period, switching the wireless power transceiver to the transmitter mode, and charging the object through the coil, the wireless power transceiver and a power management circuit and a battery, wherein the power management circuit is electrically connected to the wireless power transceiver and the battery.

19. The wireless charging switching method of claim 18, further comprising:

monitoring whether an output current of the power management circuit is less than a predetermined current value; and when the output current is less than the predetermined current value, turn off both of the receiver mode and the transmitter mode of the wireless power transceiver.

* * * * *